United States Patent [19]

Savage

[11] 4,280,357

[45] Jul. 28, 1981

[54] INSPECTION OF ELECTRICALLY NON-CONDUCTIVE WORKPIECES

[75] Inventor: Philip Savage, Littleover, England

[73] Assignee: Rolls-Royce Limited, London, England

[21] Appl. No.: 83,513

[22] Filed: Oct. 10, 1979

[30] Foreign Application Priority Data

Nov. 16, 1978 [GB] United Kingdom ............... 44830/78

[51] Int. Cl.³ ............................................. G01N 19/08
[52] U.S. Cl. .......................................... 73/104; 164/4
[58] Field of Search ....................... 73/104; 324/61 R; 164/4, 150, 45, 246; 33/174 P, 174 PA

[56] References Cited

U.S. PATENT DOCUMENTS 3,825,323  7/1974  Landwer ..................... 324/61 R X
3,985,176  10/1976  Wamester ........................... 164/45

Primary Examiner—Jerry W. Myracle
Attorney, Agent, or Firm—Cushman, Darby & Cushman

[57] ABSTRACT

A method of inspecting wax patterns for use in the lost wax casting process comprises coating the pattern with aluminum by vapor diffusion and subsequently inspecting the coated pattern using inspection apparatus adapted for the non-contacting dimensional inspection of electrically conductive workpieces.

6 Claims, 2 Drawing Figures

INSPECTION OF ELECTRICALLY NON-CONDUCTIVE WORKPIECES

This invention relates to the inspection of electrically non-conductive workpieces and in particular to the inspection of wax patterns for use in the lost wax casting process.

In the well known method of casting known as the "lost wax" process, a wax pattern of the intended artefact is covered by a slurry of refractory material. After the slurry has dried to a hard mass, the wax pattern is removed by melting whereupon molten metal is poured into the resultant cavity. After cooling, the refractory material is broken away to reveal a metal artefact substantially identical in shape to the original wax pattern.

It is obviously important to ensure that the wax pattern is dimensionally accurate prior to its use. However such patterns are particularly difficult to inspect dimensionally as a result of their softness. Thus if conventional inspection apparatus which relies on probe contact with a workpiece is employed, the probe usually penetrates the surface of the comparatively soft wax pattern. The usual method of inspecting a batch of similar wax patterns is to actually use one pattern in the casting of a metal artefact and then dimensionally inspect the artefact. Such a method is clearly undesirable however since it is time consuming and involves the loss of the wax pattern.

It is an object of the present invention to provide a method of inspecting an electrically non-conductive workpiece, such as a wax pattern, which does not involve the destruction of that workpiece.

According to the present invention, a method of inspecting an electrically non-conductive workpiece, such as a wax workpiece, comprises coating at least a portion of that workpiece with an electrically conductive material by vapor deposition and subsequently inspecting the thus coated workpiece with inspection apparatus adapted for the non-contacting dimensional inspection of electrically conductive workpieces, said inspection apparatus being provided with probe means adapted to establish electrically a non-contacting positional relationship with said electrically conductive coating on said workpiece.

Said electrically conductive material is preferably aluminum.

Said non-conductive workpiece may be a wax pattern for use in the lost wax casting process.

Said electrically conductive material may be vapor deposited on said non-conductive workpiece to a thickness within the range 0.125 to 0.25 mm.

The invention will now be described by way of example with reference to the accompanying drawings in which.

Figure 1:
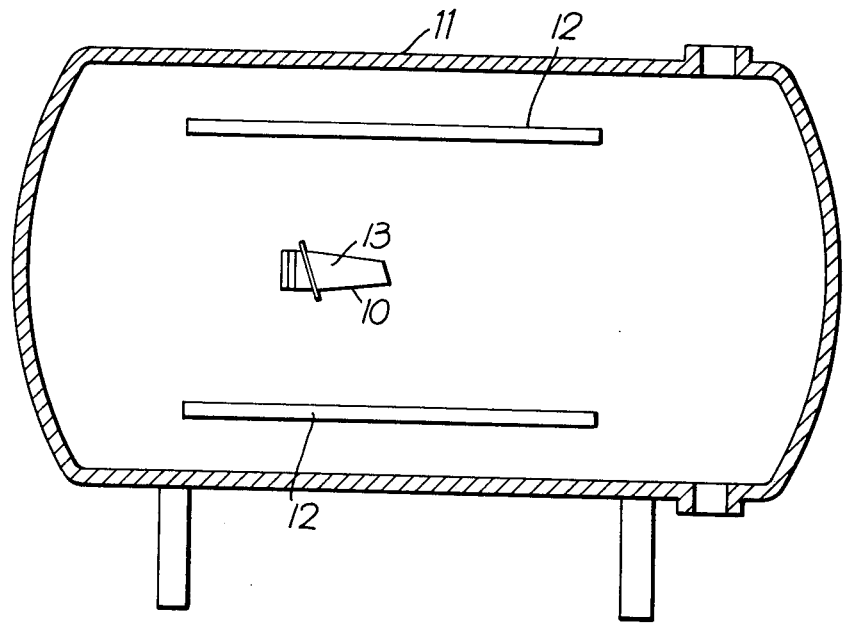
FIG. 1 is a partially sectioned side view of a vapor deposition apparatus for use in the method of the present invention.

With reference to FIG. 1 of the drawings, a wax pattern 10, in the form of an aerofoil blade for a gas turbine engine, is positioned within a chamber 11 by means which, in the interests of clarity, have been omitted. The chamber 11 is then sealed and evacuated before the heating elements 12 are activated. Each heating element 12 is adapted to support aluminum wires (not shown) which melt and vaporize as the elements 12 increase in temperature. The vaporized aluminum is subsequently deposited inter alia on the surface of the wax pattern 10 in the form of a thin aluminum coating 13.

The vapor deposition process is continued until the deposited aluminum coating 13 is between 0.125 and 0.25 mm thick; the time and temperature conditions necessary to achieve this end being determined experimentally. In certain circumstances it may be desirable to rotate the wax pattern 10 during vapor deposition in order to ensure that a substantially even aluminum coating 13 is achieved. This may be necessary for instance if the wax pattern 10 is of a particularly intricate shape.

Figure 2:
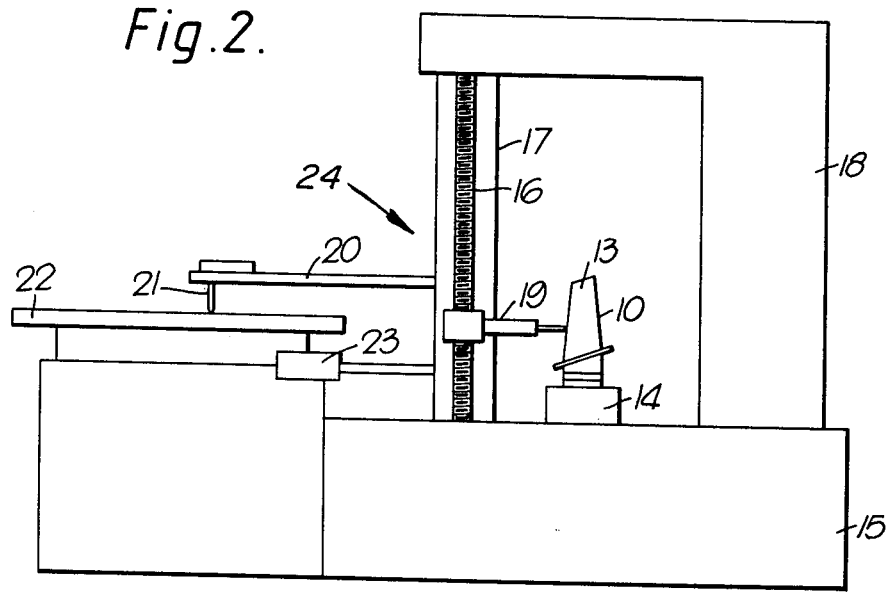
FIG. 2 is a side view of a profile plotting apparatus for use in the method of the present invention.

After vapor deposition, the coated wax pattern is removed from the chamber 11 and mounted on a rotatable table 14 provided on the bed 15 of a profile inspecting apparatus 24 which can be seen in FIG. 2. The inspection apparatus 24 is of a conventional type and its construction forms no part of the present invention. It consists essentially of a bed 15 on which two columns (a lead screw 16 and a column 17) are supported by a gantry structure 18. The first column consists of a lead screw 16 on which a probe assembly 19 is mounted. The lead screw 16 is actuated by a drive means (not shown) to enable the probe assembly 19 to be positioned at a number of discreet positions above the bed 15. The lead screw 16 and other column 17 are linked so as to be rotatable as an assembly about a common axis.

An arm 20 is attached to and adapted to rotate with the column 17. It carries a pen 21 which is positioned as as to bear upon a rotating table 22 attached to the end of the bed 15. The rotating tables 14 and 22 are arranged such that their rotational movements are synchronised.

The coated wax pattern 10 is arranged to be earthed when positioned on the rotatable table 14 and an electrical potential is applied to the probe assembly 19. Consequently when the lead screw 16 and column 17 are rotated so as to move the probe assembly towards the coated wax pattern 10, a spark will jump across the gaps between the probe assembly 19 and the aluminum coating 13 on the wax pattern 10.

The lead screw 16 and column 17 assembly are rotated by a servo mechanism 23. The servo mechanism 23 is in turn controlled by circuitry (not shown) adapted to detect capacitive changes between the probe assembly 19 and the aluminum coating 13 associated with the previously mentioned sparking and also to determine the direction of rotation of the lead screw 16 and column 17 assembly. The arrangement is such that the servo mechanism 23 drives the lead screw and column 17 assembly so that the probe assembly 19 is in turn driven towards the coated wax pattern. However before contact between the probe assembly 19 and aluminum coating 13 occurs, sparking is initiated. Capacitive changes associated with this sparking are detected by the previously mentioned circuitry with the result that the direction of rotation of the lead screw 16 and column 17 assembly is reversed. Further resultant capacitive changes are then detected which result in the probe assembly being driven back towards the aluminum coating. This action is repeated so that probe assembly 19 alternately moves towards and away from the aluminum coating 13.

As the probe assembly 19 makes electrical contact with the aluminum coating 13, the tables 14 and 22 are simultaneously rotated at identical speeds. This results in the probe assembly 19 following the profile of the coated wax pattern 13 and the pen 21 reproducing that profile on a sheet of paper provided on the surface of the rotatable table 22. Since the arm 20 is longer than the probe assembly 19, the profile plotted by the pen 21 is an enlarged copy of the profile of the coated wax pattern 10.

If it is desired to plot the profile of a different portion of the coated wax pattern 10, the lead screw 16 is rotated independently of the column 17 so as to raise or lower the probe assembly to the desired profile position.

Although a profile plotting apparatus has been described in accordance with one method of the present invention, it is possible to replace that apparatus with alternative non-contacting dimensional inspection apparatus. For instance, dimension inspection apparatus could be utilized which determines the position of discreet points on the surface of the coated wax pattern 10. Such apparatus would, however, have to operate in a similar fashion to the apparatus described above in that it would have to establish electrically a non-contacting positional relationship with the coated surface of the wax pattern 10.

It will be apparent that although the present invention has been described with reference to the vapour deposition of aluminum, other conductive coatings could be vapor deposited on to non-conductive workpiece.

I claim:

1. A method for dimensionally inspecting a wax workpiece, comprising the steps of:
   coating at least a portion of that workpiece with an electrically conductive material by vapor deposition, and
   subsequently inspecting the thus coated workpiece with inspection apparatus adapted for the non-contacting dimensional inspection of electrically conductive workpieces, said inspection apparatus being provided with probe means adapted to establish electrically a non-contacting positional relationship with said electrically conductive coating on said workpiece.

2. A method according to claim 1 wherein said step of coating comprises the step of coating at least a portion of the workpiece with aluminum by vapor deposition.

3. A method of inspecting an electrically nonconductive workpiece as claimed in claim 1 or claim 2 wherein said step of coating comprises the step of vapor depositing said electrically conductive material on said workpiece to a thickness within the range 0.125 to 0.24 mm.

4. A method for dimensionally inspecting a wax pattern for use in a lost wax casting process, comprising the steps of:
   coating at least a portion of the wax pattern with an electrically conductive material by vapor deposition, and
   subsequently inspecting the thus coated wax pattern with inspection apparatus adapted for the non-contacting dimensional inspection of electrically conductive workpieces, said inspection apparatus being provided with probe means adapted to establish electrically a non-contacting positional relationship with said electrically conductive coating on said wax pattern.

5. A method according to claim 4 wherein said step of coating comprises the step of coating at least a portion of the wax pattern with aluminum by vapor deposition.

6. A method according to claim 4 or 5 wherein said step of coating comprises the step of vapor depositing said electrically conductive material on said wax pattern to a thickness within the range of 0.125 to 0.25 mm.

* * * * *